(12) United States Patent
Sharp et al.

(10) Patent No.: US 9,870,300 B2
(45) Date of Patent: Jan. 16, 2018

(54) LOGGED EVENT FREQUENCY VISUALIZATION

(71) Applicant: International Business Machines Corporation, Armonk, NY (US)

(72) Inventors: Kathleen Sharp, Winchester (GB); Grant J. Shayler, Hursley (GB); John D. Taylor, Southampton (GB); Joe Winchester, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 13/688,638

(22) Filed: Nov. 29, 2012

(65) Prior Publication Data

US 2014/0149924 A1    May 29, 2014

(51) Int. Cl.
| | | |
|---|---|---|
| *G06F 3/0485* | (2013.01) | |
| *G06F 11/34* | (2006.01) | |
| *G06F 11/32* | (2006.01) | |

(52) U.S. Cl.
CPC ........ *G06F 11/3476* (2013.01); *G06F 11/323* (2013.01); *G06F 2201/835* (2013.01); *G06F 2201/86* (2013.01)

(58) Field of Classification Search
CPC ........... G06F 3/04855; G06F 2201/835; G06F 2201/86; G06F 11/323; G06F 11/3476
USPC ........................................ 715/787, 764, 786
See application file for complete search history.

(56) References Cited

U.S. PATENT DOCUMENTS

| | | | |
|---|---|---|---|
| 6,421,071 B1* | 7/2002 | Harrison ...................... 715/787 |
| 7,446,769 B2 | 11/2008 | Molander et al. | |
| 8,977,982 B1* | 3/2015 | Amacker ................ G06F 3/014 |
| | | | 715/784 |
| 2002/0154173 A1* | 10/2002 | Etgen .................. G06F 3/04855 |
| | | | 715/833 |
| 2003/0193524 A1* | 10/2003 | Bates et al. .................... 345/786 |
| 2005/0177790 A1* | 8/2005 | Molander et al. ............ 715/700 |
| 2007/0136232 A1* | 6/2007 | Nemoto et al. ................... 707/2 |
| 2008/0134033 A1* | 6/2008 | Burns ............... G06F 17/30864 |
| | | | 715/705 |
| 2009/0024911 A1* | 1/2009 | Margolis ...................... 715/215 |

(Continued)

OTHER PUBLICATIONS

IBM, A Method of Comparing the Time Stamp of Each Entry in Different Log Files and Displaying These Files Parallelly, Nov. 23, 2011.

(Continued)

*Primary Examiner* — Jennifer To
*Assistant Examiner* — John Repsher, III
(74) *Attorney, Agent, or Firm* — Steven M. Greenberg, Esq.; CRGO Law

(57) ABSTRACT

Embodiments of the present invention provide a method, system and computer program product for logged event frequency visualization. In an embodiment of the invention, a method for logged event frequency visualization is provided. The method includes loading into memory of a computer system a set of logged data entries and associated time stamps from a data store of log entries and computing in the computer system a frequency of logging for each of the logged data entries. The method additionally includes concurrently displaying in a log viewer both the logged data entries and also a visualization of the frequency of logging for each of the logged data entries.

9 Claims, 2 Drawing Sheets

(56) References Cited

U.S. PATENT DOCUMENTS

2010/0115443 A1* 5/2010 Richstein ..................... 715/771
2010/0284293 A1* 11/2010 Watanabe et al. ............ 370/252
2011/0154117 A1* 6/2011 Danielson ........... G06F 11/0748
714/37

OTHER PUBLICATIONS

Takada, et al., "Tudumi: Information Visualization System for Monitoring and Auditing Computer Logs," IEEE, Nov. 7, 2002.

* cited by examiner

LOGGED EVENT FREQUENCY VISUALIZATION

BACKGROUND OF THE INVENTION

Field of the Invention

The present invention relates to event logging and more particularly to visualizing logged event data.

Description of the Related Art

Event logs are collections of event data collected at various times. Generally, event logs are considered to be collections of sequentially recorded raw data and thus, event logs typically are large in size and granular in nature. Event logs have found application across a variety of systems, including computing and network monitoring, financial transaction processing and real-time machine command and control. However, in all cases, making sense of logged event data can be both processor intensive and mentally challenging.

Event log analysis, then, is required to make sense of the granular data in an event log. Event log analysis refers to tools that load and process event log data in order to present a visual reflection of the content of an event log. Aside from providing a viewer in which the raw data of an event log can be presented, typically, a log analyzer can provide graphical illustrations of different perspective views of data and thus, can be a visual reflection of one or more data reductions of the raw data of the event log. Standard log analysis tools also provide alert monitoring such that when certain logged event data crosses a pre-determined threshold, an alert can be triggered notifying a relevant individual or automated process of the observed condition.

In many instances, parsing a log of events can be of little effect for most entries in the log, but of significant effect for some entries in the log where the data in the log is collected at a great enough frequency, or too low a frequency, to indicate the occurrence of an anomaly or other event of interest. However, to detect a frequency of event collection in a log requires a viewer to focus on the time stamp information for each log entry and to manually detect when the time stamp data becomes compressed for a large number of log entries. Plainly, such an exercise if possible in a log of hundreds if not thousands or even millions of events can be tedious and prone to error.

BRIEF SUMMARY OF THE INVENTION

Embodiments of the present invention address deficiencies of the art in respect to log analysis and provide a novel and non-obvious method, system and computer program product for logged event frequency visualization. In an embodiment of the invention, a method for logged event frequency visualization is provided. The method includes loading into memory of a computer system a set of logged data entries and associated time stamps from a data store of log entries and computing in the computer system a frequency of logging for each of the logged data entries. The method additionally includes concurrently displaying in a log viewer both the logged data entries and also a visualization of the frequency of logging for each of the logged data entries.

In one aspect of the embodiment, the visualization is displayed in coordination with the display of the logged data entries such that each logged data entry is associated with a portion of the visualization indicative of a corresponding frequency of logging for the logged data entry. In another aspect of the embodiment the visualization is displayed in a scroll bar control as a graph. In this regard, scroll bar in the scroll bar control can be displayed with visual characteristics that correspond with a frequency of logging associated with a proximate portion of the visualization. For example, the visual characteristics can include the dimensions of the scroll bar control.

In another embodiment of the invention, a log event analysis data processing system is configured for logged event frequency visualization. The system includes a host computing system that includes at least one computer with memory and at least one processor. The system also includes an event logger logging entries for a monitored system. Finally, the system includes an event frequency visualization module coupled to the event logger and executing in the memory of the host computing system. The module includes program code enabled to load into memory of a computer system a set of logged data entries and associated time stamps from a data store of log entries, to compute a frequency of logging for each of the logged data entries and to concurrently display in a log viewer both the logged data entries and also a visualization of the frequency of logging for each of the logged data entries.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for logged event frequency visualization. In accordance with an embodiment of the invention, a set of logged events can be loaded into memory and different time stamps for individual ones of the logged events can be processed to identify frequency of logged events within a time period. Thereafter, the logged events can be presented in a log viewer in chronological order. Concurrently, a visual indication of a higher frequency period of logged events can be presented in the log viewer in association with one or more logged events occurring during the higher frequency period. In this way, logged events occurring during high frequency periods when many events have been logged can be readily identified in the log viewer by way of the visual indication.

Figure 1:
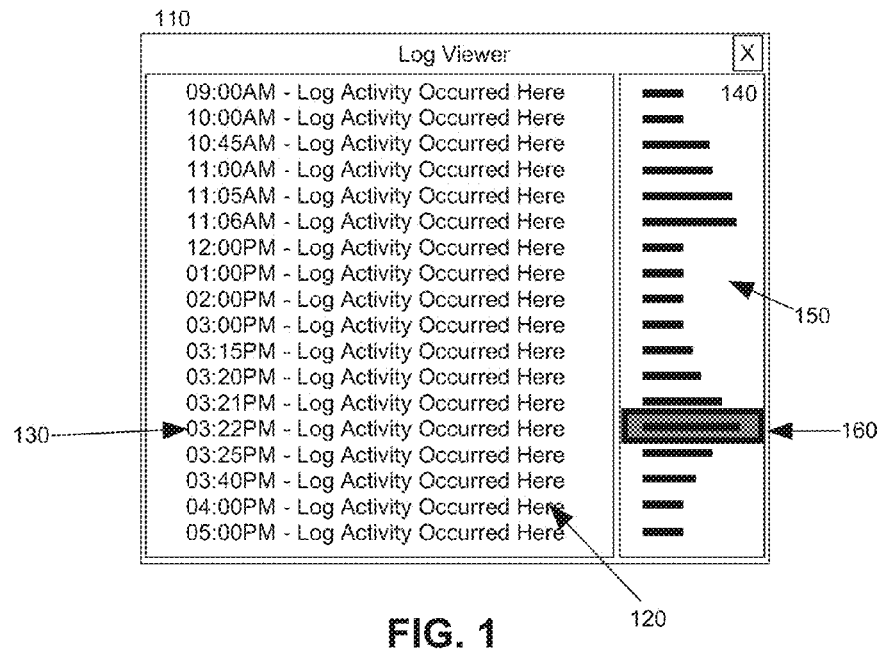
FIG. 1 is a pictorial illustration of a process for logged event frequency visualization.

In further illustration, FIG. 1 pictorially shows a process for logged event frequency visualization. As shown in FIG. 1, a log viewer 110 can be displayed to include log entries 120 and corresponding time stamps 130 reflective of either when data for the log entries 120 had been measured or logged. Of note, a frequency of the log entries 120 can be computed based upon the time stamps 130 so that the frequency reflects a number of logged entries occurring within a time period. Based upon the computed frequency of log entries 120, a frequency visualization 150 can be generated, for example a graph of frequency amplitude for each of the log entries 120.

Optionally, the frequency visualization 150 can be displayed in a scroll bar area 140. In this regard, the scroll bar area 140 can include a scroll bar 160 with dimensions determined based upon a computed frequency corresponding to a selected one of the log entries 120. More particularly, as the scroll bar 160 is manipulated to result in a selection or proximate display of a particular one of the log entries 120, a corresponding frequency value in the frequency visualization 150 can be retrieved and the dimensions of the scroll bar 160 can be computed based upon the corresponding frequency value. In this way, the scroll bar 160 itself can vary in appearance to indicate when displayed log entries have been logged with greater frequency or less frequency during a particular time period.

Figure 2:
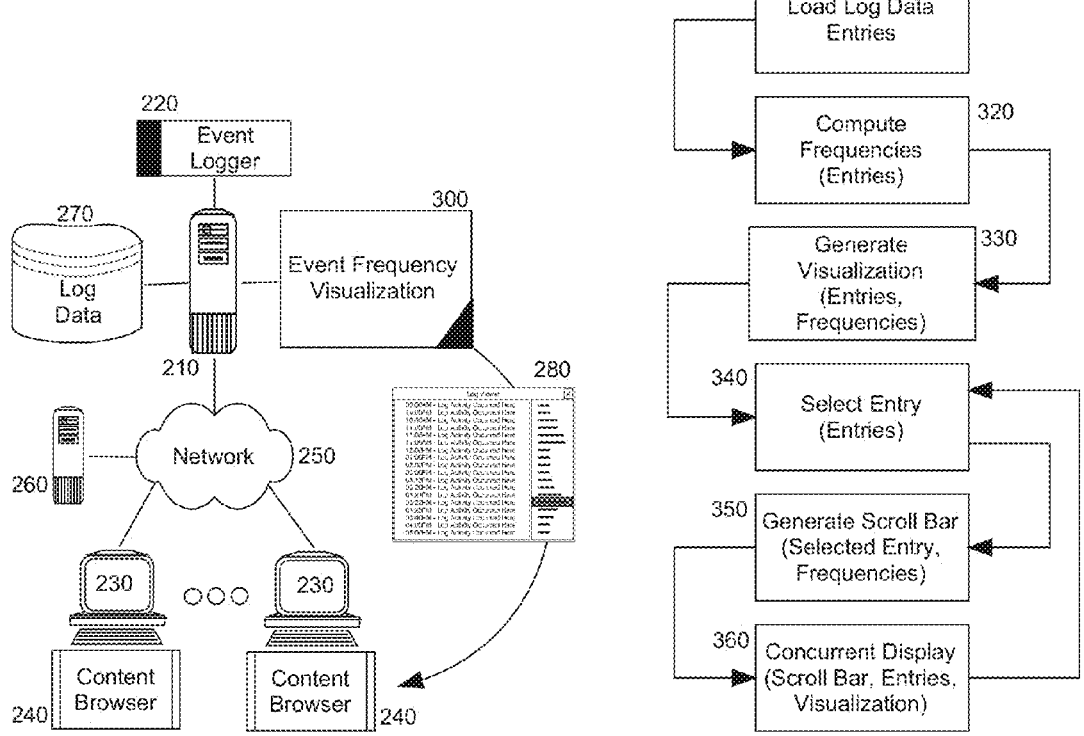
FIG. 2 is a schematic illustration of a log event analysis data processing system configured for logged event frequency visualization.

The process shown in connection with FIG. 1 can be implemented within a log event analysis data processing system. In yet further illustration, FIG. 2 is a schematic illustration of a log event analysis data processing system configured for logged event frequency visualization. The system can include a host computing system 210 that includes one or more different computers each with memory and at least one processor. The host computing system 210 can support the execution of an event logger 220 logging event data in data store 270 measured in a communicatively coupled computing device 260 monitored over computer communications network 250. Further, end users can view data logged in the data store 270 through content browsers 240 in respectively different computers from over the computer communications network 250.

Of note, an event frequency visualization module 300 can be coupled to the event logger 220 and can execute in the memory of the host computing system 210. The event frequency visualization module 300 can include program code that when executed in the memory of the host computing system 210 can be enabled to retrieve a selection of logged events in the data store 270 and compute for each of the events a frequency of event logging of the events. The program code of the event frequency visualization module 300 further can be enabled to coordinate a concurrent display of the logged events and corresponding frequency data in a single event logger interface 280 and to serve the single event logger interface 280 to requesting end users for rendering in respective ones of the content browsers 240. In this regard, the display of the corresponding frequency data can be in the form of a graph or chart wherein the amplitude of the graph corresponds to a frequency of logged events within a duration of time.

Figure 4A:
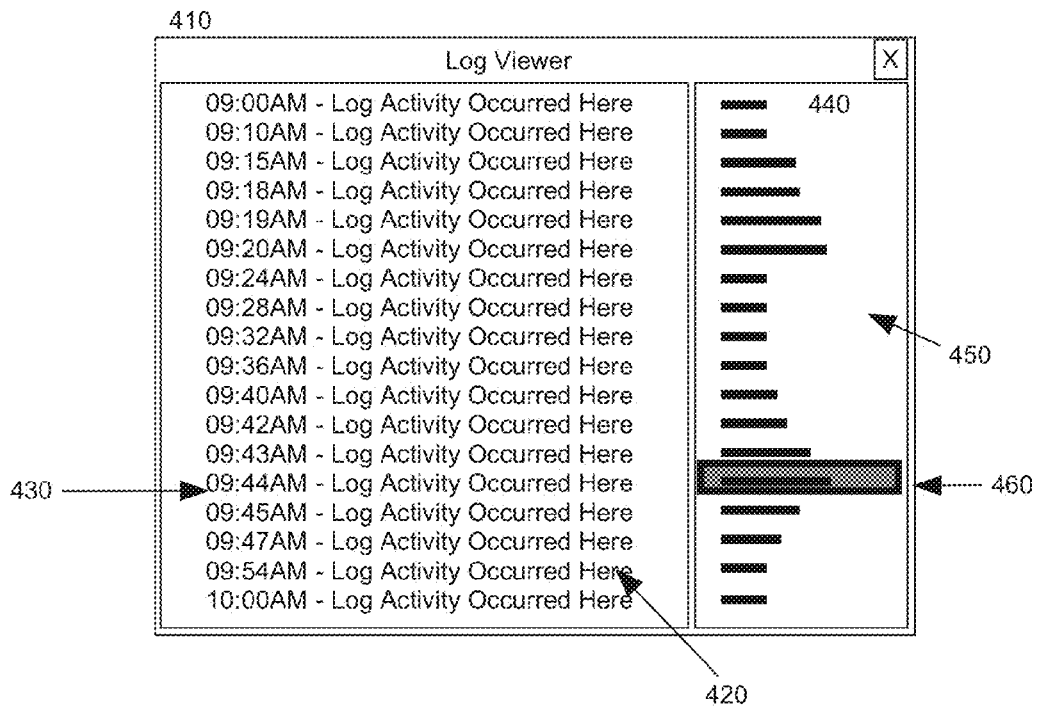
Figure 4B:
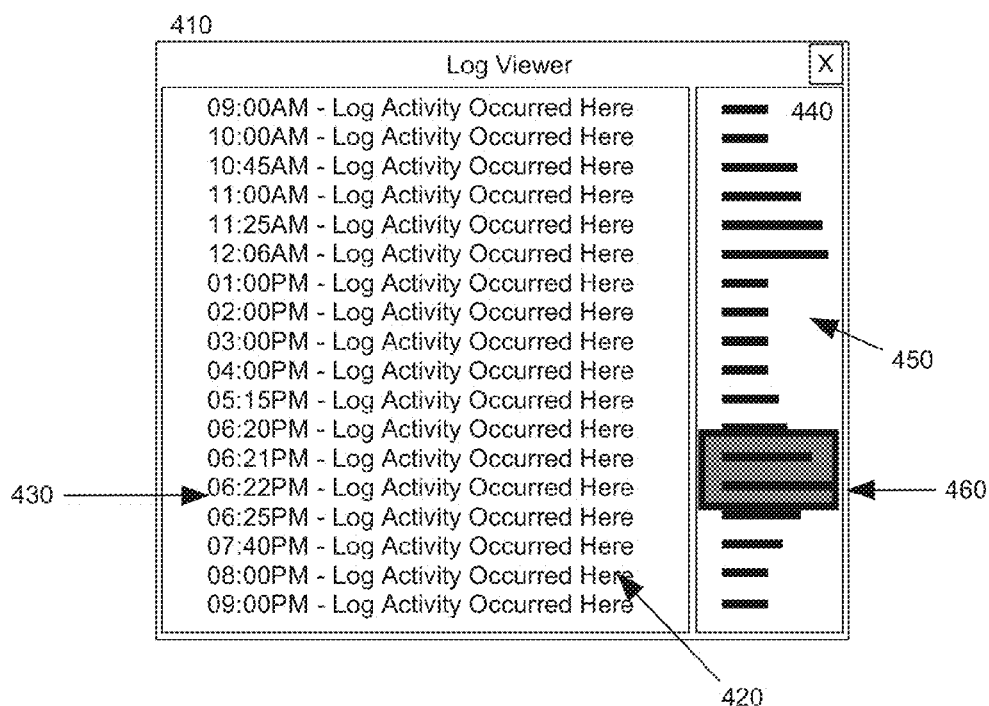

Optionally, the display of the corresponding frequency data can be disposed within a scroll bar control for scrolling a view of the logged events and the scroll bar of the scroll bar control can be dimensioned according to frequency data displayed proximately to the scroll bar. For instance, as shown in FIG. 4A, the scroll bar 460 in the scroll bar area 440 of the frequency visualization 450 of the log viewer 410 can be wider and shorter indicating a higher frequency of log entries 430 in a shorter period of time as indicated by the time stamps 430. By comparison, as shown in FIG. 4B, the scroll bar 460 in the scroll bar area 440 of the frequency visualization 450 of the log viewer 410 can be narrower and longer indicating a lower frequency of log entries 430 in a longer period of time as indicated by the time stamps 430. In either circumstance, a re-dimensioning of the log viewer 410 itself can affect a number of log entries visible in the log viewer 410 which in turn influences a dimensioning of the scroll bar 460 in the scroll bar area 440.

Figure 3:
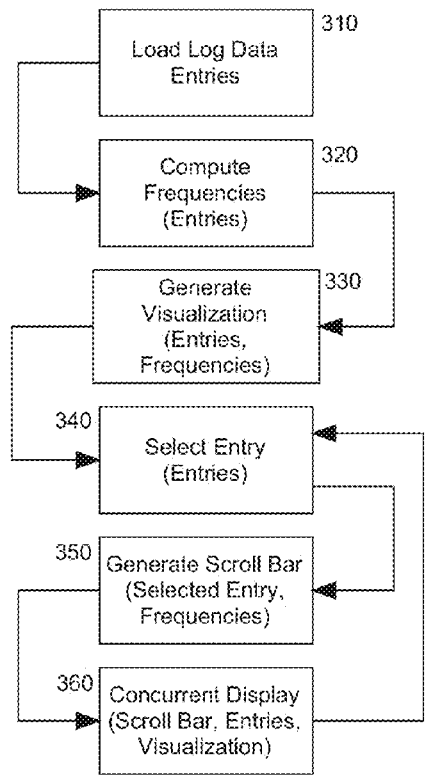
FIG. 3 is a flow chart illustrating a process for logged event frequency visualization; and, FIGS. 4A and 4B, taken together, are a pictorial illustration of a log viewer configured for the dimensioning of a scroll bar in accordance with an indicated frequency of log entries during a period of time.

In even yet further illustration of the operation of the event frequency visualization module 300, FIG. 3 is a flow chart illustrating a process for logged event frequency visualization. Beginning in block 310, a log of data entries can be loaded, each data entry having an associated time stamp indicating when the data entry had been logged. In block 320, a set of frequencies can be computed for the log of data entries indicating for each of the entries a corresponding frequency of data logging. In block 330, a visualization can be generated for the frequencies, such as a two dimensional graph of frequencies at different times. Thereafter, in block 340, a particular one of the entries of logged data can be selected and a scroll bar can be generated with display characteristics commensurate with frequency data corresponding to the selected entry of logged data. Finally, in block 360, the entries of the log can be displayed concurrently with a scroll bar control, the generated visualization of the frequencies, and the scroll bar positioned proximate to the selected entry.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for logged event frequency visualization, the method comprising:
   loading into memory of a computer system a set of logged data entries and associated time stamps from a data store of log entries;
   computing in the computer system a frequency of logging for each of the logged data entries; and,
   rendering a log viewer user interface for a log viewer and including in the rendering, a scroll bar control controlling scrolling of content within the log viewer user interface, the scroll bar control comprising a slidable thumb activating the scrolling of the content and a trough defined by distal ends of the scroll bar control, and,
   concurrently displaying in the log viewer both the logged data entries and also a visualization of the frequency of logging for each of the logged data entries the visualization being displayed within the trough of the scroll bar control of the log viewer as a graph of frequency amplitude for each of the log entries and being visible through the thumb of the scroll bar control such that the thumb of the scroll bar is transparent when passed over a portion of the graph, wherein the thumb is displayed with visual characteristics that correspond with a frequency of logging associated with a proximate portion of the visualization.

2. The method of claim 1, wherein the visualization is displayed in coordination with the display of the logged data entries such that each logged data entry is associated with a portion of the visualization indicative of a corresponding frequency of logging for the logged data entry.

3. The method of claim 1, wherein the visual characteristics are dimensions of the scroll bar control.

4. A log event analysis data processing system configured for logged event frequency visualization, the system comprising:
- a host computing system comprising at least one computer with memory and at least one processor;
- an event logger logging entries for a monitored system; and,
- an event frequency visualization module coupled to the event logger and executing in the memory of the host computing system, the module comprising program code enabled to load into memory of a computer system a set of logged data entries and associated time stamps from a data store of log entries, to compute a frequency of logging for each of the logged data entries, to render a log viewer user interface for the log viewer and to include in the rendering, a scroll bar control controlling scrolling of content within the log viewer user interface, the scroll bar control comprising a slidable thumb activating the scrolling of the content and a trough defined by distal ends of the scroll bar control, and to concurrently display in the log viewer both the logged data entries and also a visualization of the frequency of logging for each of the logged data entries the visualization being displayed within the trough of the scroll bar control of the log viewer as a graph of frequency amplitude for each of the log entries and being visible through the thumb of the scroll bar control such that the thumb of the scroll bar is transparent when passed over a portion of the graph, wherein the thumb is displayed with visual characteristics that correspond with a frequency of logging associated with a proximate portion of the visualization.

5. The system of claim 4, wherein the visualization is displayed in coordination with the display of the logged data entries such that each logged data entry is associated with a portion of the visualization indicative of a corresponding frequency of logging for the logged data entry.

6. The system of claim 4, wherein the visual characteristics are dimensions of the scroll bar control.

7. A computer program product for logged event frequency visualization, the computer program product comprising:
- a non-transitory computer readable storage memory device having computer readable program code embodied therewith, the computer readable program code comprising:
- computer readable program code for loading a set of logged data entries and associated time stamps from a data store of log entries;
- computer readable program code for computing in the computer system a frequency of logging for each of the logged data entries; and,
- computer readable program code for rendering a log viewer user interface for a log viewer and including in the rendering, a scroll bar control controlling scrolling of content within the log viewer user interface, the scroll bar control comprising a slidable thumb activating the scrolling of the content and a trough defined by distal ends of the scroll bar control, and,
- computer readable program code for concurrently displaying in the log viewer both the logged data entries and also a visualization of the frequency of logging for each of the logged data entries the visualization being displayed within the trough of the scroll bar control of the log viewer as a graph of frequency amplitude for each of the log entries and being visible through the thumb of the scroll bar control such that the thumb of the scroll bar is transparent when passed over a portion of the graph, wherein the thumb is displayed with visual characteristics that correspond with a frequency of logging associated with a proximate portion of the visualization.

8. The computer program product of claim 7, wherein the visualization is displayed in coordination with the display of the logged data entries such that each logged data entry is associated with a portion of the visualization indicative of a corresponding frequency of logging for the logged data entry.

9. The computer program product of claim 7, wherein the visual characteristics are dimensions of the scroll bar control.

* * * * *